(No Model.) 3 Sheets—Sheet 2.
E. S. ALVORD.
MACHINE FOR STIFFENING HAT BRIMS.
No. 588,372. Patented Aug. 17, 1897.
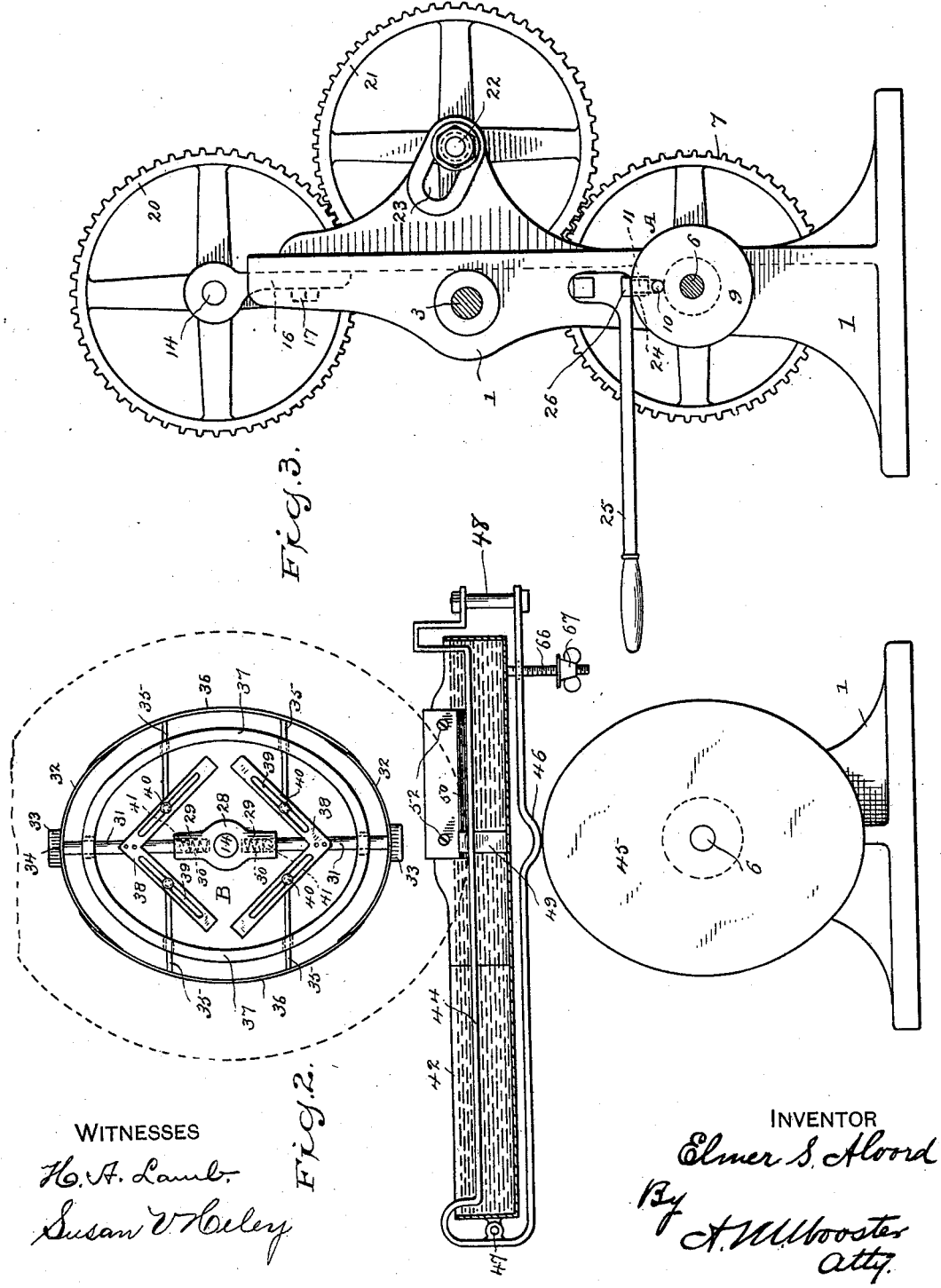
WITNESSES
H. A. Lamb
Susan V. Heiley
INVENTOR
Elmer S. Alvord
By A. M. Wooster
Atty.

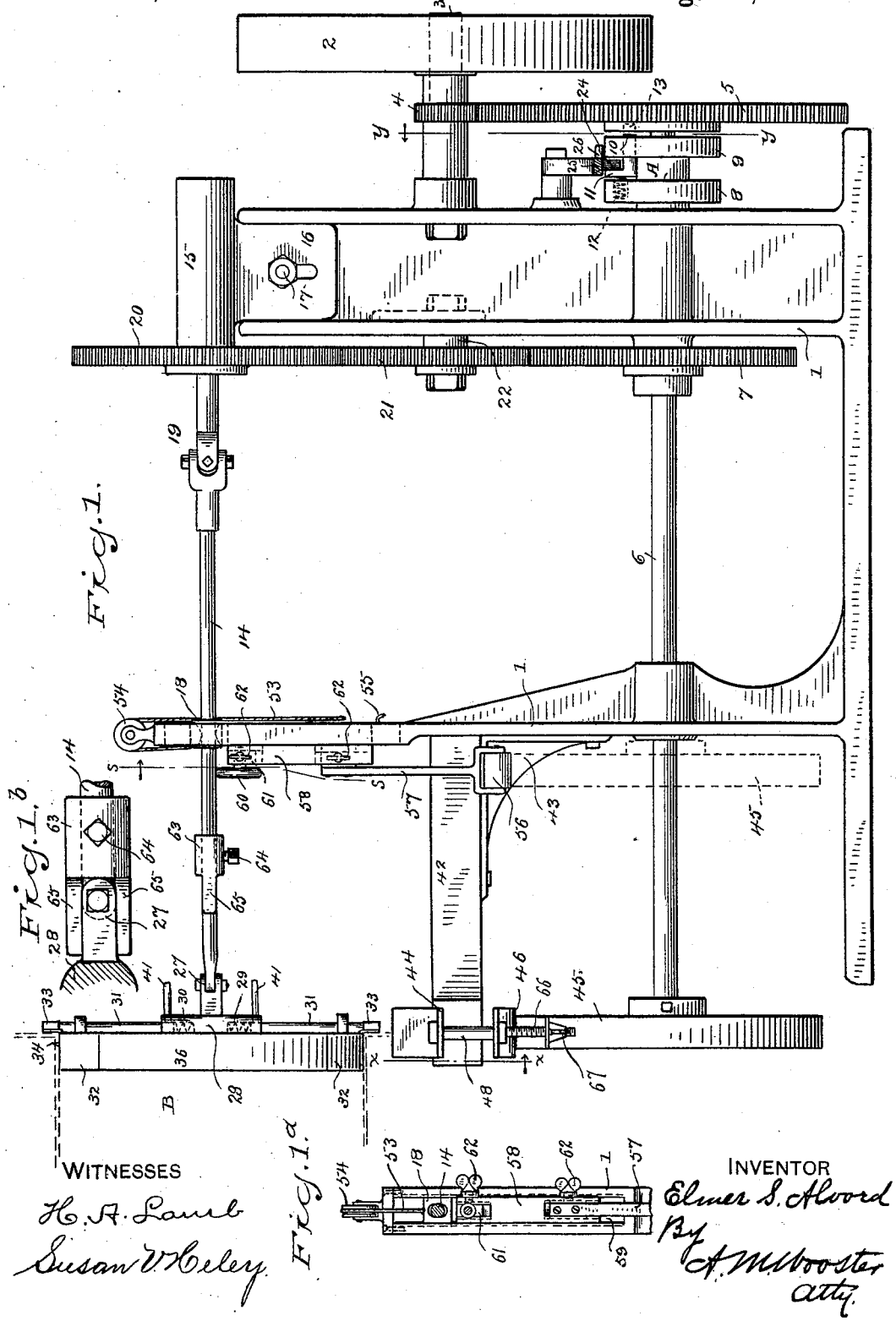

(No Model.)　　　　　　　　　　　　　　　　3 Sheets—Sheet 3.
E. S. ALVORD.
MACHINE FOR STIFFENING HAT BRIMS.
No. 588,372.　　　　　　　　　Patented Aug. 17, 1897.
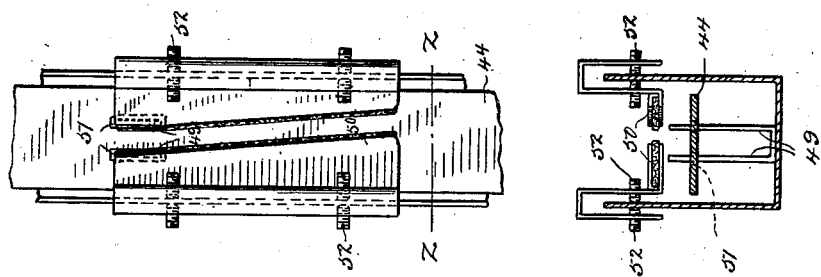
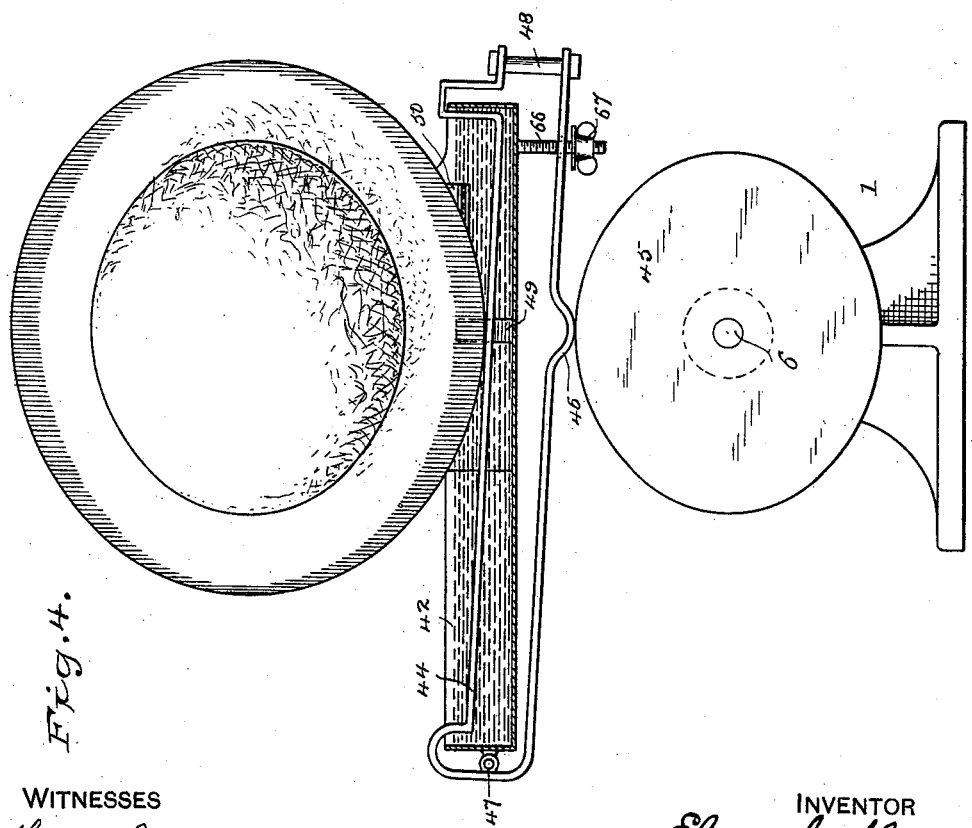
WITNESSES　　　　　　　　　　　　　　　　INVENTOR
H. A. Lamb　　　　　　　　　　　　　　　Elmer S. Alvord
Susan V. Heley　　　　　　　　　　　　　By A. M. Wooster
　　　　　　　　　　　　　　　　　　　　　　Atty.

UNITED STATES PATENT OFFICE.

ELMER S. ALVORD, OF DANBURY, CONNECTICUT, ASSIGNOR OF ONE-HALF TO WILLIAM H. BARNUM, OF SAME PLACE.

MACHINE FOR STIFFENING HAT-BRIMS.

SPECIFICATION forming part of Letters Patent No. 588,372, dated August 17, 1897.

Application filed February 18, 1897. Serial No. 623,952. (No model.)

*To all whom it may concern:*

Be it known that I, ELMER S. ALVORD, a citizen of the United States, residing at Danbury, in the county of Fairfield and State of Connecticut, have invented certain new and useful Improvements in Machines for Stiffening Hat-Brims; and I do hereby declare the following to be a full, clear, and exact description of the invention, such as will enable others skilled in the art to which it appertains to make and use the same.

My invention has for its object to produce a machine for stiffening the edges of the brims of either stiff or soft hats which will automatically vary the depth to which the brim is stiffened at the sides and ends, as may be required.

With this end in view my invention consists in various details of construction and combinations of elements which I will hereinafter describe, and then specifically point out in the claims.

In the accompanying drawings, forming part of this specification, Figure 1 is an elevation of the machine complete. Fig. 1ª is a detail elevation of a portion of the frame, the carrier-shaft being in section on the line *s s* in Fig. 1; Fig. 1ᵇ, a detail view, on an enlarged scale, illustrating means for making the outer end of the upper shaft rigid in stiffening the brims of soft hats; Fig. 2, an end view as seen from the left in Fig. 1, the trough being in section on the line *x x*, the expanding carrier appearing in full lines and a hat thereon being indicated by dotted lines; Fig. 3, a section on the line *y y* in Fig. 1, looking toward the left; Fig. 4, a view corresponding with Fig. 2, with the exception that the hat on the expanding carrier is shown in full lines and a reverse position of the expanding-carrier regulating-cam and movable platform is shown; Fig. 5, a detail plan view, on an enlarged scale, of the vertically-movable platform, the guides, and the scrapers; and Fig. 6 is a section on the line *z z* in Fig. 5.

1 denotes framework which may be of any ordinary or preferred construction. Power is applied to drive the machine by means of a belt (not shown) passing over a belt-pulley 2, mounted on a stud 3, extending outward from the frame.

4 denotes a pinion formed integral with or rigidly secured to the belt-pulley and turning with it on the stud. This pinion meshes with a gear-wheel 5, which turns freely on a shaft 6, journaled in the framework and carrying a gear-wheel 7. Gear-wheel 5 is connected to shaft 6 by means of a clutch which as a whole I designate as A. The clutch which I preferably use is constructed as follows:

8 and 9 denote disks rigidly secured to shaft 6.

10 denotes a pin which is socketed in disk 9 and is provided with an arm 11, which is engaged by a spring 12, socketed in disk 8. The normal action of this spring is to force the pin forward into a socket 13 (see dotted lines, Fig. 1) in the hub of gear-wheel 5, thereby connecting the gear-wheel to the shaft and transmitting motion to the shaft.

14 denotes a shaft which is journaled in a bearing 15, carried by a plate 16, which is adjustably secured to the framework, as by a bolt 17, passing through a slot in the plate, and in a block 18, (see Fig. 1ª,) which is adapted to slide in the frame, as will be more fully explained. Shaft 14 is provided between bearing 15 and block 18 with a universal joint, as at 19, and lies loosely in block 18, as indicated in the drawings.

20 denotes a gear-wheel carried by a shaft 14, which meshes with an idler gear-wheel 21, which in turn meshes with gear-wheel 7 on shaft 6. The idler gear-wheel 21 is mounted on a stud 22, which is adjustable in an inclined slot 23 in the frame.

Shaft 14 must necessarily be vertically adjustable to provide for different widths of hat-brims, and it is of course necessary that the idler should be correspondingly adjustable, so that motion may be transmitted from shaft 6 to shaft 14 at any adjustment of the latter shaft.

In practice the machine is started by the operator in stiffening each hat and is stopped automatically at the end of the first revolution. This is accomplished by means of a wedge 24, carried by an operating-lever 25, which is shown as a bell-crank lever. The operation of the wedge is to pass between disk 9 and arm 11 on pin 10 and withdraw the pin from socket 13 at the completion of the revolution. The instant the pin is withdrawn from the socket shaft 6 is disconnected from gear-wheel 5 and shafts 6 and 14 both stop. The operating-lever is provided with a lug 26, which rests upon the top of disk 9 and retains the operating-lever in its normal position.

When it is desired to start the machine, the operator seizes lever 25 and gives it an upward movement, which draws the wedge forward and out from between disk 9 and arm 11. Spring 12 then forces the pin into socket 13, and thus connects shaft 6 with gear-wheel 5. When the operator releases lever 25, it will be retained in its normal position by means of lug 26, which rests upon disk 9. When the revolution of shaft 6 is nearly completed, the wedge will again pass in between arm 11 and disk 9 and withdraw the pin from the socket against the power of the spring, thus disconnecting shaft 6 from gear-wheel 5 and retaining the pin in the retracted position until it is again released by a movement of the operating-lever. At the outer end of shaft 14 is an expanding carrier for a hat-body, which I designate as a whole as B. This carrier is secured to the shaft by a hinged joint 27.

The construction of the carrier which I preferably use is as follows: At the end of the shaft (see Fig. 2) is a hub 28, provided with sockets 29, which receive springs 30 and the inner ends of rods 31, which are normally forced outward by the springs. These rods are in line with each other—that is, extending in opposite directions from the hub. Each rod carries at its outer end a section 32 of an expanding band and also a block 33, upon which the brim of the hat-body rests, one of said pins also carrying a pin 34, which centers the hat-body on the carrier. 35 denotes other rods, two on each side of the carrier, the rods on each side carrying a section 36 of the expanding band, thus making four sections which complete the band. Rods 31 and 35 pass freely through a guide 37, (shown in the present instance as oval,) by which they are held in position.

38 denotes angle-pieces rigidly secured to rods 31, each angle-piece being provided in each arm with a slot 39, which receives a head 40 of one of the rods 35.

It will readily be understood from Fig. 2 that outward movement of rods 31 will carry the end sections 32 of the expanding band outward and will also carry the angle-pieces outward, and, furthermore, that when the angle-pieces are moved outward rods 35 will also be moved outward through their engagement with the slots in the angle-pieces, and will move the side sections 36 of the expanding band outward, this expansion of the band being normally effected through the action of springs 30. The outward movement of rods 31 and 35 is limited by the engagement of pins 41 (see Fig. 1) with the outer ends of slots in the back of hub 28, these slots being indicated by dotted lines in Fig. 1, but not appearing in full lines in the drawings. Pins 41 pass through these slots in the back of hub 28 and engage rods 31. Said pins are, in fact, the operating-handles of the expanding carrier.

In putting a hat in place on the expanding carrier the operator moves pins 41 inward, which retracts rods 31 and also rods 35 through the engagement of their heads with the slots in the angle-pieces, and these rods move the sections of the expanding band inward. The operator then places the hat in position, as indicated in dotted lines in Fig. 1, the ends of the brim where the brim joins the body resting upon blocks 33. The operator then releases pins 41, and springs 30 move rods, angle-pieces, and the sections of the expanding band outward, the latter engaging the inner side of the body where it joins the brim, the hat-body being of course properly centered when it is placed upon the carrier and being retained in the centered position by the pin 34, which engages the body. When the edge of the brim has been stiffened, as will be more fully explained, the operator simply contracts the expanding band by means of pins 41, removes the hat-body which has been operated upon, and places another in position, as already described.

42 denotes a tank which carries the stiffening material and which is supported in any suitable manner from the framework, as by a bracket 43, as shown in the drawings.

In stiffening the brims of stiff hats the edges of the brims rest upon a vertically-movable platform 44, which is immersed in the tank, as clearly shown in Fig. 2. This platform is engaged by a regulating-cam 45, carried at the outer end of shaft 6. I have shown this platform as made from a single strip of metal, a portion of which lies on the outer side of the tank and may or may not be provided with a boss 46 to form a contact-surface for the cam. The strip is hinged, as at 47, to one end of the tank and passes over the top of the tank out of contact therewith and downward into the tank, forming the operative portion of the platform, which, as already stated, lies immersed in the stiffening material. The other end of the strip passes over the other end of the tank out of contact therewith, so as to permit ample vertical movement of the platform, and the ends of the strip are adjustably secured together in any suitable manner, as by a bolt 48. It will be readily understood, therefore, that in stiffening the brims of stiff hats the depth to which the brims will be immersed in the stiffening material in the tank, and consequently the depth to which they will be stiffened, will depend upon the movement of the platform, which is controlled by the regulating-cam. It will be noted from the drawings that the regulating-cam and the expanding carrier rotate together, the expanding carrier and the hat-body thereon rising and falling freely, as already explained. It is of course well understood that in ordinary stiff hats it is necessary to stiffen the sides of the brim to a greater depth than the ends in order to provide for the curl.

In Figs. 1 and 2 I have illustrated the position of the parts at the instant the end of a hat is being stiffened. It will be noticed that the long diameter of both the expanding carrier and the regulating-cam is in the vertical position and consequently that movable platform 44 is raised to its highest position in the tank, thus insuring that this portion of the brim will not pass deeply into the stiffening material. In Fig. 4 I have illustrated the reverse position of the parts—that is, the position at the instant the side of a hat-brim is being stiffened. At this instant the long diameter of both the expanding carrier and the regulating-cam is in the horizontal position. The movable platform is therefore allowed to sink deeper in the tank, and the edge of the brim which rests thereon consequently sinks deeper into the tank, thereby stiffening the brim to a greater depth.

In order that the depth to which the brims are stiffened at the sides may be regulated by the operator without change of cams, I provide a screw 66, which extends downward from the bottom of the tank and passes loosely through the strip forming the vertically-movable platform. A nut 67 on this screw stops the downward movement of the platform and consequently limits the depth to which the sides of a hat-brim whose edge rests on the operative portion of the platform is immersed in the stiffening material. As shown in the drawings, (see Fig. 4,) the nut is not operative, the regulating-cam determining the depth to which both ends and sides of the hat-brim are stiffened. By turning the nut up on the screw, however, the operator may lessen the depth to which the sides of the hat-brim are immersed in the stiffening material by lessening the downward movement of the platform. By connecting the expanding carrier to shaft 14 by means of a hinge-joint I insure that when either side of the hat-brim is resting upon the platform the hat-body will not be tilted, owing to the angle at which the outer end of shaft 14 will lie, the hinge-joint, in connection with the guides 49, which will be again referred to, acting to retain the hat-body in substantially a vertical position, no matter what portion of the brim may be resting upon the platform. By using a hinge-joint instead of a universal joint I insure that in the stopping position, as when removing or placing a hat in position, the pivot of the hinge will be in the vertical position and the expanding carrier will not drop down.

49 denotes guides which extend upward from the bottom of the tank and between which the hat-brim is placed, the guides acting to retain it in the extended position, and the platform being provided with slots 51, through which the guides pass freely. (See Fig. 5.) Above the guides are wipers 50, which are held in operative position by set-screws 52, which engage the sides of the tank. (See Fig. 6.) The operative faces of the wipers lie obliquely, as clearly shown in Fig. 5, to compensate for the scope of the hat-brim—that is to say, so that neither side of the brim will press forcibly against the wipers, it being contemplated that the brim will pass freely between the wipers, which will remove the surplus stiffening material from both sides thereof. The wipers may be readily adjusted toward or from each other by means of the set-screws 52.

When it is desired to place a hat upon the expanding carrier or to remove a hat therefrom, block 18, shaft 14, and the carrier may be lifted by means of a cord 53, one end of which is attached to block 18 and which passes over a pulley 54, the lower end of said cord being provided with a weight or, if preferred and as shown in the drawings, with a loop or ring adapted to engage a hook 55 to retain the block, shaft, and expanding carrier at the raised position. Having placed a hat in position on the expanding carrier, the operator simply disengages cord 53 from the hook and allows the parts to return to their normal position, as in the drawings.

In Figs. 1, 1ª, and 1ᵇ I have, in addition to the form already described, illustrated a modification of my invention which is especially adapted for use in stiffening the brims of soft hats. In this form the vertically-movable platform is not used, but the depth to which the edges of the brims are stiffened is regulated by causing the expanding carrier and the hat-body thereon to rise and fall as it rotates by means of the regulating-cam. In order to accomplish this result, regulating-cam 45 is set inward on shaft 6 to the position indicated in dotted lines and is engaged by a roller 56 on an arm 57, which is adjustably secured in a block 58, which in the present instance is adapted to slide in an opening 59 in the frame, which appears clearly in Fig. 1ª.

60 denotes a roller carried by a block 61, which is adjustably secured in block 58, said block 61 and arm 57 being locked in position after adjustment in any suitable manner, as by set-screws 62. When the machine is operating upon stiff hats, block 58 simply drops down to the end of opening 59, and rollers 56 and 60 are inoperative. When the regulating-cam is set inward, however, to the position shown in dotted lines in Fig. 1, as in stiffening soft hats, arm 57 and block 61 are adjusted in block 58 to such a position that the weight of the outer end of shaft 14 and the expanding carrier will rest wholly upon roller 60, so that as the regulating-cam revolves the outer end of the shaft and the expanding carrier will be raised and lowered in precisely the same manner as the movable platform is raised and lowered in the other form. The depth to which the brim is stiffened depends, as in the other form, upon the depth to which it is immersed in the tank, and this is regulated substantially as in the other form, the actual difference in the two adjustments of the machine being that in one form the brim is stiff and the weight of shaft 14 and the carrier is supported by the brim, which rests upon the movable platform, and in the other form, the brim being soft, the outer end of shaft 14 and the carrier are supported by block 58, arm 57, and rollers 56 and 60, one of said rollers resting upon the regulating-cam. In stiffening the brims of soft hats it is necessary that the expanding carrier be rigidly connected to shaft 14. In order to accomplish this result without change of parts, I provide on shaft 14 a sleeve 63, having forwardly-extending arms 65, which is locked either in or out of operative position by means of a set-screw 64, said sleeve being locked out of its operative position, as in Fig. 1, when the machine is used for stiffening the brims of stiff hats. In Fig. 1$^b$ I have shown said sleeve as pushed forward into its operative position and the arms 65 as lying on opposite sides of hinged joint 27 and holding the joint rigid, as in stiffening the brims of soft hats. In changing from soft hats to stiff hats said sleeve is slid back again to the position shown in Fig. 1, which illustrates the position of the parts in stiffening the brims of stiff hats with the exception that block 58 and the parts carried thereby are shown at the raised position, it being understood that when the regulating-cam is slid forward on shaft 6 from the position shown in dotted lines in Fig. 1 to the position shown in full lines in said Fig. 1 block 58, carrying arm 57 and rollers 56 and 60, will simply drop down to the end of opening 59, so that said parts will be wholly out of operative position.

Having thus described my invention, I claim—

1. A machine for stiffening hat-brims comprising in its construction a shaft provided with a universal joint and having at its outer end a hat-carrier, a tank for stiffening material, a shaft carrying a regulating-cam and connections intermediate the regulating-cam and the hat-carrier whereby a hat upon the carrier is caused to rise and fall in the tank as it rotates to regulate the depth to which the brim is stiffened at the sides and ends.

2. A machine for stiffening hat-brims comprising in its construction a shaft provided with a universal joint, a hat-carrier hinged to the outer end of said shaft, said hinge being rigid when the long diameter of the carrier is vertical and operative when horizontal, a tank for stiffening material, a shaft carrying the regulating-cam and intermediate connections whereby the brim of a hat upon the carrier is caused to rise and fall in the tank, substantially as described, for the purpose set forth.

3. A machine for stiffening hat-brims comprising in its construction a shaft provided with a universal joint, a hat-carrier hinged to the outer end of said shaft, a sleeve on said shaft adapted to lock the hinge rigidly in stiffening soft hats, a tank for stiffening material, a shaft carrying a regulating-cam and intermediate connections whereby the brim of a hat upon the carrier is caused to rise and fall in the tank substantially as described for the purpose set forth.

4. A machine for stiffening hat-brims comprising in its construction a shaft provided with a universal joint, a hat-carrier hinged to the outer end of said shaft, a tank for stiffening material, a shaft carrying a regulating-cam, a vertically-movable platform in the tank upon which the brim of a stiff hat rests and which itself rests upon the regulating-cam so that the hat-brim is caused to rise and fall in the tank to regulate the depth to which the brim is stiffened.

5. A machine for stiffening hat-brims comprising in its construction a shaft provided with a universal joint and having at its outer end a hat-carrier, a tank for stiffening material, a platform made from a strip of metal and hinged to said tank, a portion of said platform lying on the under side of the tank and a portion passing upward over the ends of said tank out of contact therewith and downward into the tank forming the operative position of said platform upon which the brim of a stiff hat rests a regulating-cam which engages the under side of the platform causing the operative portion thereof to rise and fall in the tank and regulate the depth to which the brim is stiffened.

6. In combination a vertically-movable shaft, a hat-carrier at the outer end thereof, a tank, a regulating-cam and a vertically-movable platform which is engaged by said cam and a portion of which is immersed in the tank, substantially as described for the purpose set forth.

7. The combination with a vertically-movable shaft, a hat-carrier at the end thereof, a tank and a regulating-cam, of a vertically-movable platform which is engaged by said cam and a portion of which is immersed in the tank, and wipers lying above the platform and having oblique vertical faces for the purpose set forth, whereby surplus stiffening material is removed from the surface of the hat-brims.

8. In a machine of the character described, the combination with a vertically-movable shaft and a hat-carrier, of a tank, a platform in said tank upon which the brim of a stiff hat rests and a regulating-cam which causes the platform to rise and fall so that the depth to which the brim is immersed in the tank varies as the carrier rotates.

9. An expanding carrier for hats comprising in its construction a guide 37, rods 31 and 35 passing freely through said guide and carrying at their outer ends sections of an expanding band, angle-pieces carried by rods 31 and having slots 39, said rods 35 being provided with heads which engage said slots so that when rods 31 are moved in or out rods 35 are moved in the same direction and the band is expanded or contracted.

10. An expanding carrier for hats comprising in its construction a guide 37, rods 31 and 35 passing freely through said guide and carrying at their outer ends sections of an expanding band, a rotating hub having sockets which receive the inner ends of rods 31, springs lying in said sockets and acting to force said rods outward, angle-pieces carried by rods 31 and having slots 39, said rods 35 being provided with heads which engage said slots as and for the purpose set forth.

11. An expanding carrier for hats comprising in its construction a guide 37 and rods 31 and 35 passing freely through said guide and carrying at their outer ends sections of an expanding band, said rods 31 also carrying blocks 33, and pins 41 for the purpose set forth, a rotating hub having sockets which receive the inner ends of rods 31, springs lying in said sockets and acting to force the rods outward, angle-pieces carried by rods 31 and having slots 39, said rods 35 being provided with heads which engage said slots as and for the purpose set forth.

12. In a machine of the character described the combination with a tank for stiffening material and a vertically-movable platform hinged to said tank, a portion of said platform lying on the under side of the tank and a portion passing upward over the ends of said tank out of contact therewith and downward into the tank forming the operative portion of said platform, and a regulating-cam which raises and lowers the platform as and for the purpose set forth.

13. In a machine of the character described the combination with a tank having guides 49 extending upward from the bottom thereof which support the edge of a hat-brim, a vertically-movable platform hinged to said tank, and extending above and below said tank, the regulating-cam which raises and lowers the platform and oblique-faced wipers which remove surplus stiffening material from the sides of the hat.

14. The combination with the tank, movable platform and regulating-cam, of shaft 14 and a hat-carrier hinged thereto as and for the purpose set forth.

15. The combination with the tank, movable platform and regulating-cam, of shaft 14 having a universal joint 19 and at its outer end a hat-carrier and a vertically-movable block in which said shaft is journaled as and for the purpose set forth.

16. The combination with the tank, movable platform and regulating-cam, of shaft 14 having a universal joint and at its outer end a hat-carrier, a vertically-movable block in which said shaft is journaled and means, substantially as described and shown for raising said block and shaft and retaining the hat-carrier out of operative position as and for the purpose set forth.

17. The combination with the tank, movable platform and shaft 6 carrying the regulating-cam, of shaft 14 carrying a hat-carrier, driving mechanism, mechanism for communicating motion from one shaft to the other, and clutch mechanism which connects said shafts with the driving mechanism and which automatically disconnects said shafts from the driving mechanism at the completion of a revolution.

18. The combination with a vertically-movable shaft having a hat-carrier at its outer end and a tank, of a regulating-cam, a vertically-movable platform a portion of which is immersed in the tank and a portion under the tank in position to be engaged by the regulating-cam and a screw 66 extending from the tank and passing through the portion of the platform under the tank and carrying a nut which may limit the downward movement of the platform when the long diameter of the regulating-cam is horizontal substantially as described for the purpose set forth.

In testimony whereof I affix my signature in presence of two witnesses.

ELMER S. ALVORD.

Witnesses:
ELI. C. BARNUM,
EMMA J. BLOOMER.